US006845587B2

(12) United States Patent
Smiley

(10) Patent No.: US 6,845,587 B2
(45) Date of Patent: Jan. 25, 2005

(54) TREE ROOT INVIGORATION PROCESS

(75) Inventor: E. Thomas Smiley, Fort Mill, SC (US)

(73) Assignee: The F.A. Bartlett Tree Expert Company, Stamford, CT (US)

( * ) Notice: Subject to any disclaimer, the term of this patent is extended or adjusted under 35 U.S.C. 154(b) by 0 days.

(21) Appl. No.: 10/336,881

(22) Filed: Jan. 6, 2003

(65) Prior Publication Data

US 2004/0128909 A1 Jul. 8, 2004

(51) Int. Cl.[7] ............................................. A01B 79/00
(52) U.S. Cl. ................................................. 47/58.1 SC
(58) Field of Search ...................... 47/58.1 SC; 172/21, 172/22; 37/321, 323; 111/7.1, 127; 405/269, 128.1

(56) References Cited

U.S. PATENT DOCUMENTS

| | | | | |
|---|---|---|---|---|
| 2,083,153 A | * | 6/1937 | Irish | 111/7.1 |
| 2,242,789 A | * | 5/1941 | McFee | 111/7.1 |
| 4,429,647 A | * | 2/1984 | Zinck | 111/118 |
| 4,682,550 A | * | 7/1987 | Joy | 111/7.1 |
| 4,807,545 A | * | 2/1989 | Joy | 111/7.1 |
| 5,088,562 A | * | 2/1992 | Shields | 172/22 |
| 5,170,943 A | * | 12/1992 | Artzberger | 239/532 |
| 5,212,891 A | * | 5/1993 | Schuermann et al. | 37/323 |
| 5,361,711 A | * | 11/1994 | Beyerl | 111/127 |
| 5,782,414 A | * | 7/1998 | Nathenson | 239/589 |
| 5,802,996 A | * | 9/1998 | Baxter | 111/118 |
| 5,966,847 A | * | 10/1999 | Nathenson et al. | 37/347 |
| 6,158,152 A | * | 12/2000 | Nathenson et al. | 37/347 |

OTHER PUBLICATIONS

E.T. Smiley, Air Excavation: The next Arboricultural Frontier, Dec. 1999, Arbor–Age (Smiley).*
The Care Of Trees, Construction Tree Preservation, 2001, The Care Of Trees (TCOT).*
Marty Shaw, Dealing with Damage: What to Do when Roots Are Injured, Oct. 2001, Arbor–Age.*
Advertisement of "The Air–Spade™ Supersonic Air Jet Soil Excavation Tool".
Susan D. Day and Nina L. Bassuk article entitled A Review of the Effects of Soil Compaction and Amelioration Treatments of Landscape Trees published I the Journal of Arboriculture 20(a): Jan. 1994.; pp. 9–16.
David Oltman article entitled "It's a Blast" published in the California Farmer; Jul., 1995; pp. 10–24.
Dr. Tom Smiley article entitled "Strategies for reducing Soil Compaction" published in Tree Care Industry; Apr. 1997; pp. 24–32.
Karen D. Smith, Peter B. May and Gregory M. Moore article entitled "The Influence of Compaction and Soil Strength on the Establishment of Four Australian Landscape Tees"; published in the Journal of Arboriculture 17(1): Jan. 2001; pp. 1–7.
Richard Natherson and Andrew Jarabak article entitled "The Evolution of Air Tools for Use in Arboriculture" published in Tree Care Industry; May, 2001; pp. 49–51.
Gary W. Watson, Patrick Kelsey and Klaus Woodtli article entitled "Replacing Soil in the Root Zone of Mature Trees for Better Growth" published in the Journal of Arboriculture 22(4): Jul. 1996; pp. 167–172.
Dr. E. Thomas Smiley article entitled "Air Excavation to Improve Tree Health" published in Tree Care Industry; May, 2001; pp. 44–48.

* cited by examiner

*Primary Examiner*—Michael J. Carone
*Assistant Examiner*—Bret Hayes
(74) *Attorney, Agent, or Firm*—St. Onge Steward Johnston & Reens LLC

(57) ABSTRACT

A method for improving the rooting soil around a plant by defining an improvement area around the trunk of the plant and utilizing an air excavator to loosen the existing rooting soil in the improvement area, the method also includes treating the existing soil with a treatment to encourage growth of the plant roots in the existing treated soil.

9 Claims, 5 Drawing Sheets

TREE ROOT INVIGORATION PROCESS

FIELD OF THE INVENTION

BACKGROUND OF THE INVENTION

Woody plants, such as trees and shrubs, are primary landscape plants. Once carefully selected and planted, it is desirable for the plants to grow to mature size and enhance the aesthetics in settings such as residences as well as parks, corporate campuses, university grounds, and boulevards.

In the popular mind, roots of woody plants, especially tree roots, grow deep and anchor a tree securely underground in a root pattern providing more or less a mirror image of the plant's above surface branch structure. Such a misconception is illustrated in FIG. 6 in the tree labelled A. The truth, however, is much different. Most tree species and other primary landscape plants do not have such tap roots. Even when species that are predisposed to tap roots, such as oaks, walnuts, and hickories, attempt to grow tap roots, root growth is dependent on soil conditions. Hard impenetrable soil tend to make these trees grow fibrous root systems instead of tap roots.

In the much more common fibrous systems, root growth occurs predominantly in a layer of about 18 inches below the ground surface as illustrated in FIG. 6 in the tree labeled B. Even more surprising, more than half of all root growth occurs in the top most 9 inches of soil. The root zone 100 does not end at the dripline 110, i.e. the maximum perimeter of the crown (as is commonly assumed), but spreads beyond this area. However, the root zone within the dripline 110 is the most critical part of the root zone 100 since the most significant rooting occurs within that area.

Unfortunately not all primary landscape plants are able to reach or maintain a healthy maturity. Root disorders are the leading cause of premature decline of woody plants that are the primary landscape plants. Root disorders cause over 80% of landscape plant failures. Arboriculture research suggests that the most significant limiting factor on root development is soil compaction. Soil compaction limits root growth and health because roots are unable to penetrate the compacted soil. Soil normally consists of solid particles of sand, clay, and silt and pores filled by water and/or air. Soil becomes compacted when the solid particles are packed together by reducing pore space.

Roots grow when soil conditions are favorable. Ideal growing conditions for plants exist when solids and pores are nearly equal in volume. A forest setting provides optimal growing conditions for roots. Debris, which is not cleared away in natural settings, forms pockets within the soil that maintain moisture and air in combination with the soil. The disintegrating debris provides nutrients, encourages growth of favorable mycorrhizae fungi, and protects from disease by promoting healthy growth. Most trees form a symbiotic relationship with mycorrhizae fungi. In return for nutrition from the host plant, mycorrhizae fungi increase the root's efficiency.

Soil compaction arises in certain soils and weather conditions, and where the soil is exposed to traffic. Soil compaction reduces the amount of organic matter, nutrition, and favorable fungi available to the roots. Even in serene settings such as parks, soil compaction often occurs because of construction activity during the establishment of the campus, pedestrian and service vehicle traffic during occupancy, athletic and recreational activity in landscaped areas, or incorrect landscaping practices.

Root growth will also be hampered by compacted soil because the soil retains an incorrect moisture content. Compacted soil can suffer from excessively high or excessively low moisture contents.

Compacted soil in low lying areas typically puddles rain water on the surface for some time after a downpour. Lacking sufficient porosity to efficiently percolate to groundwater levels, the water seeps throughout the soil filling available pores. The saturated soil encourages disease bearing microbes to attack both the favorable fungi and the roots. Even when roots are able to grow in compacted soil, root growth is generally lower than normal since mycorrhizae fungi may be inadequate present or the roots are under attack from disease.

In contrast, compacted soil in higher terrain may experience rain water run-off instead of percolation of water into the soil. Thus, even when rainfall is adequate for plant growth, the soil may be too dry, and the roots and favorable fungi can wither away.

Reviving woody plants that are in decline is usually preferred to replanting. Revival avoids costs for removal and additional costs for replacement. Additionally, the loss of trees or shrubs adversely impacts privacy, shade, noise reduction, aesthetics, and property values during the time it takes for replacements to regrow to the size of the removed plants.

Typically, revival has meant either aggressively fertilizing the subject plant or loosening the soil by laborious means. Fertilization may be accomplished by applying fertilizer on the ground surface and watering the plant. Revival success is dependent on the degree of soil compaction and existing moisture content. To reach roots directly, fertilizer may be injected as a water based solution into the rooting soil.

Other methods include laboriously exposing roots using trowels and small digging implements. Once exposed, the roots were reburied with new loose soil or covered with the existing soil now more loosened. This method is similar to the way archeologists dig for shards of pottery—slow and tedious.

An improvement over manual excavation is a vertical mulching technique where a grid of 1 to 2 inch holes is drilled in the rooting soil. The holes are then backfilled with porous material and/or fertilizer. This method has limited effectiveness because the beneficial effects are limited to the area where each hole is drilled, and mechanical excavation traditionally is not recommended since it easily damages sensitive plant roots. Another technique, radial trenching, involves using a small backhoe to loosen soil along radial lines extending for a distance from the tree trunk out to the dripline of the tree. However, this technique can be destructive and damage root systems.

A relatively new technique of soil loosening uses compressed air. Compressed air released at supersonic speed fractures the soil, with minimal damage to roots. Unlike porous soil, non-porous matter such as roots remain minimally damaged by the compressed air. The soil granules size after fracture is dependent on soil type, moisture content, and degree of compaction. Soil fracturing avoids the problems of mechanical excavation.

Fracturing soil by using compressed air is popularly used on lawns and turfs, such as golf courses. To maximize efficiency compressed air is injected in a grid. The grid is spaced so to aerate the soil evenly throughout a specified area by fracturing the soil. To keep the fractures open under continued usage of turf, fill material such as polystyrene pellets are forced into the soil with the pressurized air.

However, such method is inappropriate for a woody landscape plants because turf plants and woody landscape plants differ fundamentally. In fast growing turf plants, individual plants are intertwined. Thus if one plant dies, another quickly takes its place. However, woody landscape plants are more substantial and even when in grouped together fatal damages done to one is not easily corrected by natural instinct by other to take the place of the declining plant. Thus, to improve the rooting soil of woody landscape plants a method different from the one being used in other landscaping must be used.

Therefore, what is desired is a method of improving the rooting soil of a woody landscape plant.

What is also desired is a method of cost effectively improving the rooting soil of a woody landscape plant.

What is also desired is a method with an optional feature incorporating an expert system in the decision making process of improving the rooting soil of a woody landscape plant.

SUMMARY OF THE INVENTION

Accordingly, it is an objective of the invention to provide a method of improving the rooting soil of a woody landscape plant.

Another object of the invention is to provide a method of improving the rooting soil of a woody landscape plant that is cost effective.

These and other objects of the invention are achieved by the provision of a method of improving the rooting soil of a woody landscape plant comprising the steps of exposing a root collar of a plant; defining a first improvement zone encompassing the root plate area; excavating the first improvement zone with an air excavator; and adding a beneficial treatment to the first improvement zone.

In one embodiment an expert system is queried to define a critical root zone and/or to define one or more improvement zones.

The invention and its particular features and advantages will become more apparent from the following detailed description considered with reference to the accompanying drawings.

DETAILED DESCRIPTION OF THE DRAWINGS

Figure 1:
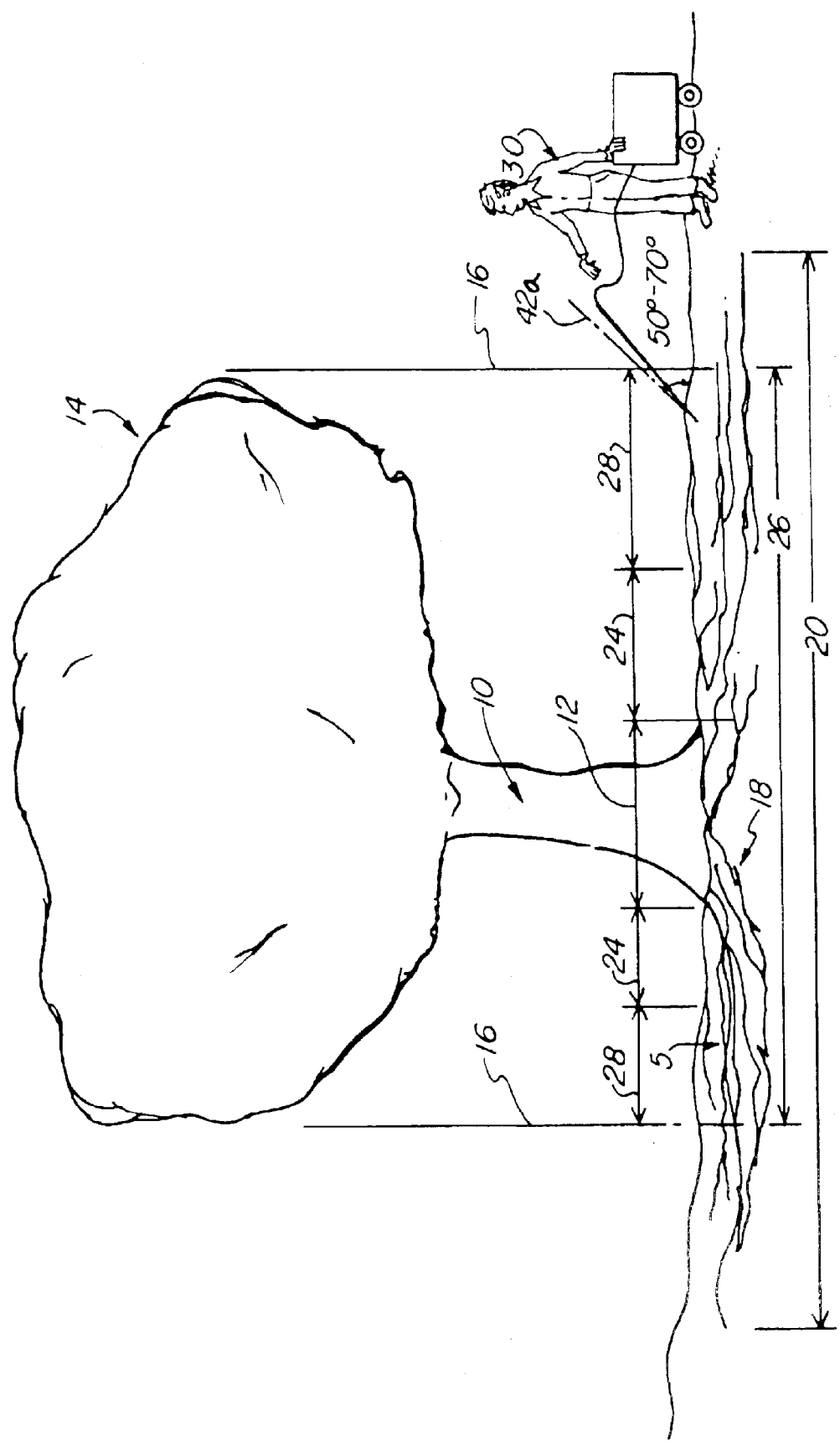
FIG. 1 is an elevation view of a tree treated by a method of improving the rooting soil in accordance with one embodiment of the invention.

FIG. 1 is an elevation view of a tree treated by a method of improving the rooting soil in accordance with one embodiment of the invention. Specimen 10, such as a tree or a group ornamental tree or shrubs, is on the property of a client and has a trunk. The tree has a root collar 12, which is the zone where the trunk transitions to the tree roots. Root collar 12 should be located a few inches below the soil surface. Specimen 10 has crown 14 with dripline 16, and roots 18 planted in rooting soil 5. Roots 18 extend through an area identified as the root plate 20.

For clarity a substantially even ground surface is depicted; but a sloping, rolling, or other type of terrain may be equally applicable.

For clarity only one user, arborist-user 30, is described herein. However, it is easily understood that arborist-user 30 may be one or more than one person, i.e. a professional, such as an arborist, who utilizes his/her education and/or judgment in implementing the present invention and a technician, who implements the present invention physically. For example, in accordance with one embodiment of the invention an arborist acting as arborist-user 30 makes a professional evaluations regarding areas wherein the present invention is to be utilized in corporate office park and stakes one or more areas for improvement of rooting soil for a plurality of trees 10. Thereafter, a technician acting as arborist-user 30 operates machinery.

In accordance with one embodiment of the invention, a technician acting as arborist-user 30 queries an expert system implemented as a checklist or punchlist, or in another format, for example as a printed material or as software executing on a computing device; an interactive program accessing a knowledge database on a computing device; an interactive communication, for example a telephone hotline, with an expert; or any other means or method wherein criteria-driven and/or judgment-based decisions maybe made.

Figure 2:
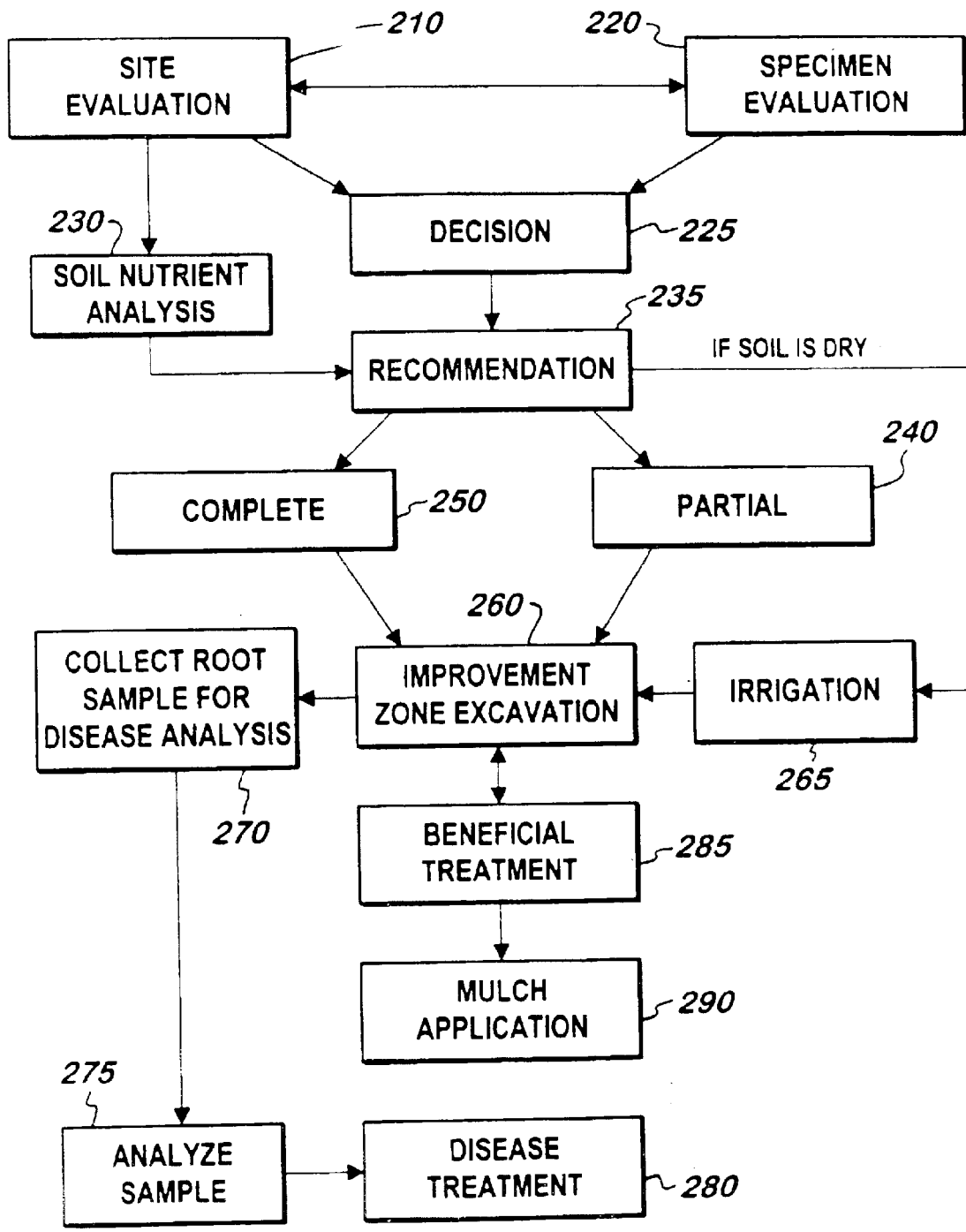
FIG. 2 is a flowchart showing steps of improving the growth of a woody landscaping plant in accordance with one embodiment of the invention.
Figure 3:
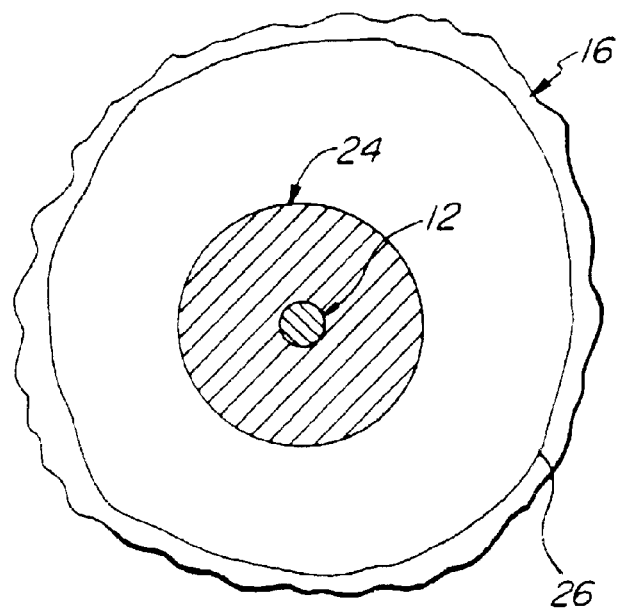
FIG. 3 is a top plan view of at least one woody primary landscaping plant treated by a method of improving the rooting soil in accordance with one embodiment of the invention.
Figure 4:
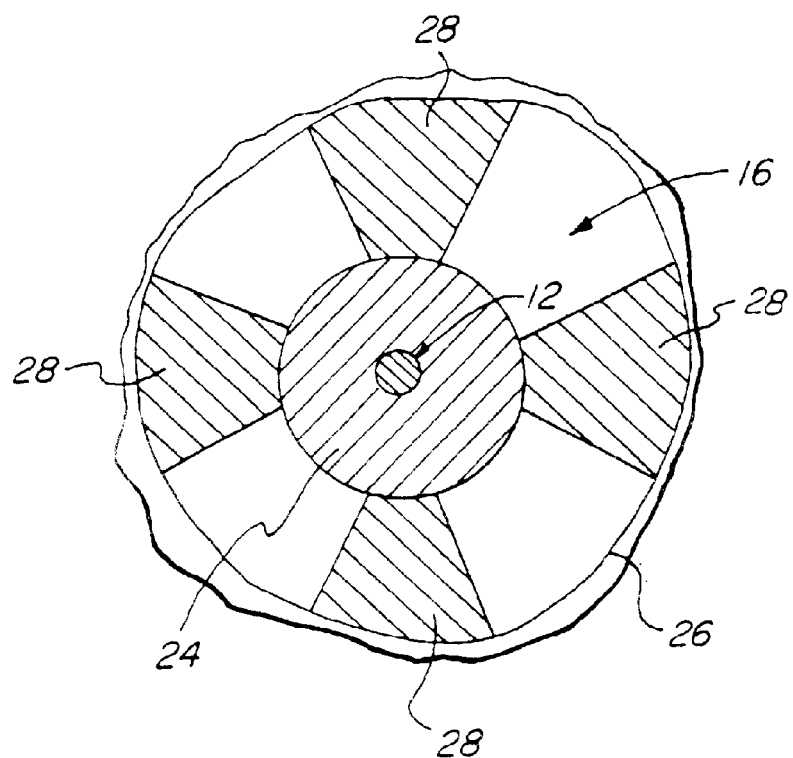
FIG. 4 is a top plan view of at least one woody primary landscaping plant treated by a method of improving the rooting soil in accordance with another embodiment of the invention.

FIG. 2 is a flowchart of the steps of improving the growth of a woody landscaping plant in accordance with one embodiment of the invention. FIGS. 3 and 4 are top plan views of a woody primary landscaping plant treated by a method of improving the rooting soil in accordance with one embodiment of the invention. In FIG. 3, a basic improvement of the rooting soil has been undertaken and in FIG. 4 a complete improvement of the rooting soil has been undertaken.

Upon being called by a client or prospective client for a consultation or as part of regular landscape maintenance plan, arborist-user 30 conducts a comprehensive evaluation of the appropriateness of improving the rooting soil.

Inappropriate conditions for improving the rooting soil may exist. For example, a landscape site evaluation 210 may indicate that the site is ill-suited for a tree or that a species or specimen are ill-suited for the location based on terrain, species type, or micro-climate. For example, subject specimen 10 may be shadowed by larger trees or may not withstand wind at the location and never reach expected full dimension at maturity.

A specimen evaluation 220 of specimen 10 may reveal that specimen 10 is not a healthy specimen because of disease unrelated to soil conditions or if a soil related disease has progressed too far so that improving the soil would be improper. Upon a negative evaluation, arborist-user 30 would advise the client of this and in consultation with a client reach a decision 235. Decision 235 may include correcting above ground health issues of specimen 10, or if appropriate a different solution rather than reviving specimen 10 may be selected for the client's landscaping needs.

If reviving specimen 10 is a feasible option, decision 235 is made to continue with soil evaluation 230 to determine potential benefits of improving the rooting soil 5. If specimen 10 is evaluated as potentially benefiting from improving rooting soil 5, then rooting soil 5 is evaluated for key components of root growth. Evaluating rooting soil 5 may include one or more of the following tests: presence of nutrients; pH and organic matter levels; soil penetrability and density, and percolation. Based on soil evaluation 230, arborist-user 30 may make recommendation 235 to the client whether a basic improvement 240 or complete improvement 250 of rooting soil 5 or no improvement should be undertaken. Decision 235 may also be based on other types of judgments arborist-user 30 may see fit.

In accordance with one embodiment of the invention, basic improvement 240 of rooting soil 5 of specimen 10 is undertaken. A basic improvement 240 may be appropriate if specimen 10 has entered premature decline only recently or as a preventative measure. Basic improvement 240 may also be appropriate for cost efficiency or any other reason that arborist-user 30 with or without consultation with the client determines as appropriate.

In basic improvement 240, rooting soil 5 is improved in a selected zone. Typically this will be a first root zone, herein referred to as first improvement zone 24, which is defined as an area surrounding root collar 12 as illustrated in FIG. 3a in accordance with one embodiment of the invention. The size of first improvement zone 24 is determined by arborist-user 30 and may vary according to a number of factors. These factors may include: the species of specimen 10; the type of ground surface, whether rolling or flat; the compaction of the soil, financial and other consideration; the type of adjacent landscaping species, and any other factors useful in making a decision. However, the basic improvement may be applied to other areas of the rooting soil.

Preferably, first improvement zone 24 is a circumferential area around root collar 12, having a diameter which is 3–4 times the diameter of the tree trunk. However, for other types of woody plants, first improvement zone 24 may be follow the pattern of the woody plants. For example ornamental shrubbery, that may collectively be planted in a straight line or a curved pattern and have stems forming collectively collar 12 that follows this straight line or curved pattern which line or pattern first improvement zone 24 would substantially follow. First improvement zone 24 may also be non-circumferential as for example when an area is covered by a finished surface such as a sidewalk, tennis court, graveled or cleared walk, or similar.

In accordance with another embodiment of the invention, a complete improvement of rooting soil 5 of specimen 10 is undertaken. A complete improvement may be appropriate if specimen 10 has extensive decline or is unlikely to grow to full maturity without such a rooting soil improvement. In a complete improvement, rooting soil 5 is improved in the first improvement zone 24, forming an area around root collar 12; and within at least one second improvement zone 28 of the critical root zone 26. Typically, the critical root zone is the circumferential area defined by dripline 16 of specimen 10, i.e. the maximum perimeter of crown 14 of specimen 10. However, critical root zone 26 may also be larger or smaller depending on the species of specimen 10. Critical root zone 26 may also differ from the area defined by dripline 16, for example, when specimen 10 has been severely damaged by disease and crown 14 is abnormally small.

Second improvement zone 28 is selected to encompass at least a portion of critical root zone 26. As depicted in FIG. 4, second improvement zone 28 maybe pie shaped segments radiating outward from first improvement zone 24 to the edge of critical root zone 26. Therein, preferably second improvement zone 28 comprises multiple areas of critical root zone 26 outside of first improvement zone 24 totaling 50% of the area of the critical root zone 26 outside of first improvement zone 24. As shown, in one preferred embodiment there are preferably four such areas which are spaced roughly equally apart and have roughly equal areas. However, second improvement zone 28 may encompass any portion or portions or the entire of critical root zone 26. Second improvement zone 26 may also be smaller to avoid areas that are covered by a finished surface such as a sidewalk, tennis court, graveled or cleared walk, or similar.

To prepare the soil for improvement zone excavation 260 of improvement zone 24, 28; improvement zone 24, 28 should be irrigated 265 at least two (2) or three (3) calendar days prior to excavation 260. However, if rainfall in the seven (7) calendar days, prior to excavation 260 has exceeded one inch or more then irrigation 265 is not necessary.

Figure 5:
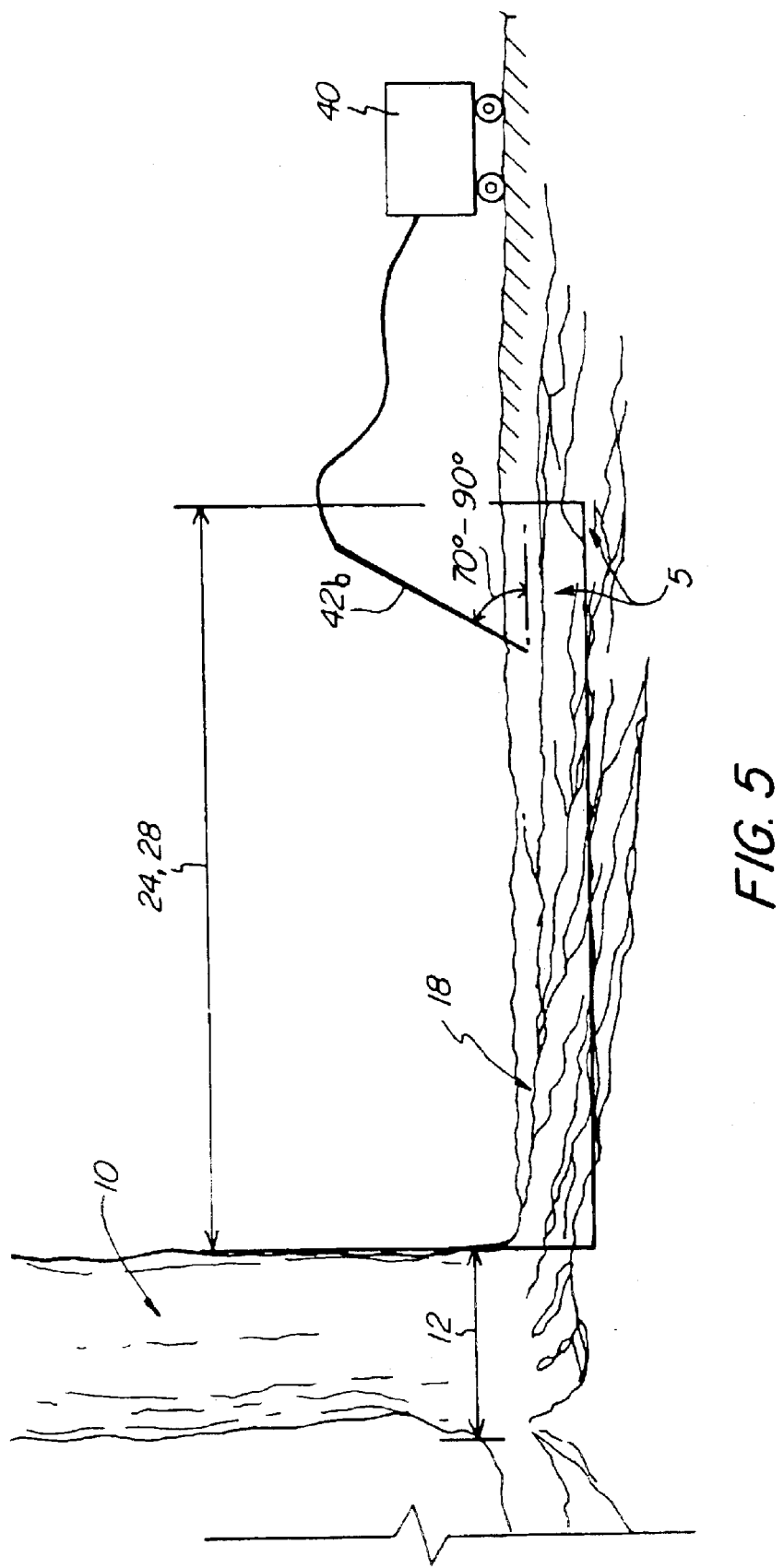
FIG. 5 is a cross-section of an improvement zone being improved in accordance with one embodiment of the invention.
Figure 6:
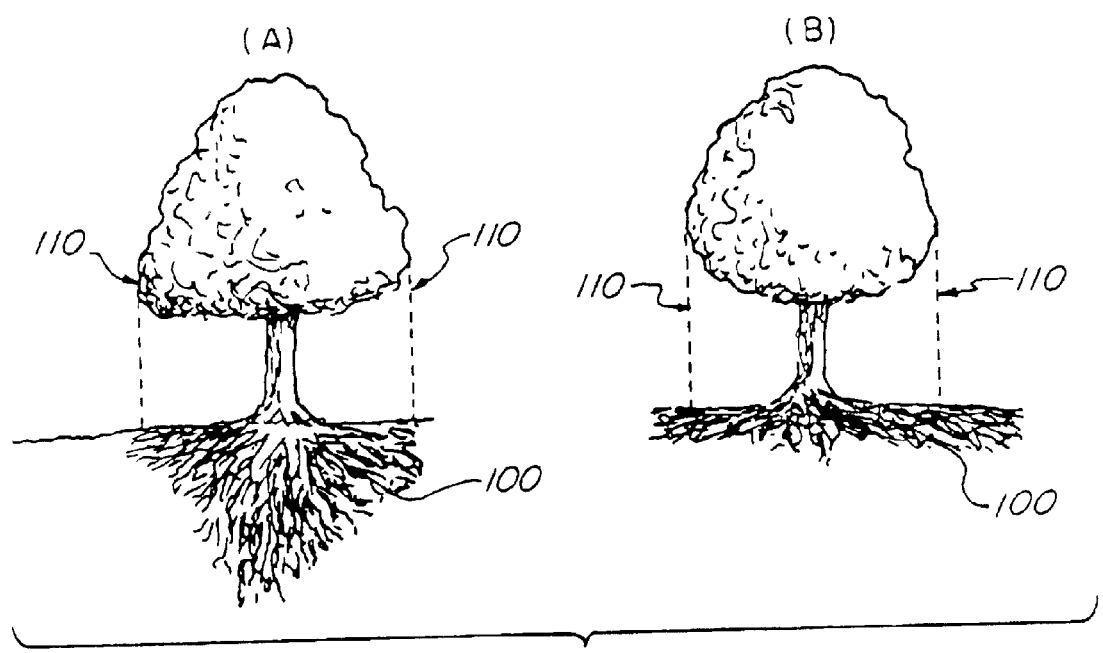
FIG. 6 is a depiction of two trees, Tree A is a depiction of a common misconception of a tree root system; Tree B is a depiction of an actual tree root system.

FIG. 5 is a cross-section of an improvement zone being improved in accordance with one embodiment of the invention. Arborist-user 30 uses air excavator 40 to loosen soil in the improvement zones 24, 28 to a depth of six (6) to eight (8) inches. Air excavator 40 may be any type of tool that aerates the soil using compressed air without substantially disturbing the roots of specimen 10. Preferably, air excavator 40 is an AIR SPADE™ manufactured by Concept Engineering Group of Pittsburgh, Pa., or an AIR KNIFE manufactured by Easy Use Air Tools Inc. of Alison Park, Pa. However, any other similarly functioning device may also be used.

In an initial soil loosening step, the arborist-user will uncover the root collar using the air excavator 40 held at an angle 42a in a range of 50° to 70° from horizontal and directs air pressure at the root collar area to excavate the soil around the root collar. Then the arborist-user 30 will proceed with loosening of soil in the first improvement area 24. The arborist in this step holds a handle portion at an angle 42b in a range of 70° to 90° from horizontal and directs air pressure, typically between 90 and 120 psig at a rate of 150 scfm or more (at 90 psig), into the ground to loosen the soil within improvement zone 24, 28. Beneficial treatment 285 comprising a mixture of organic matter, fertilizer, and/or mycorrhizae fungi is applied to improvement zone 24, 28 by inserting it into rooting soil 5 with the compressed air. The mixture comprising beneficial treatment 285 is selected by arborist-user 30 to best suit the needs of specimen 10.

In accordance with one embodiment of the invention, an application of mulch 290 is made at a time after improvement 250. therein, a layer 2 to 4 inches think of mulch is placed at least in first improvement zone 24 and/or second improvement zone 28.

In accordance with one embodiment of the invention, if root disease is suspected as a cause in premature decline or if root tissue suspected of being diseased is detected, a root sample is collected 270. Analysis 275 is then performed on the root sample to determine if a disease is present. Such a disease is then treated 280 after the completion of the rooting soil improvement.

What is claimed is:

1. A method of improving existing rooting soil around a plant comprising the steps of:

selecting a portion of the existing rooting soil surrounding the plant as a first improvement zone;

loosening the existing rooting soil in the first improvement zone with an air excavator which releases compressed air at supersonic speed, to a depth of around 6 to 8 inches below ground level;

evaluating the existing rooting in the first improvement zone;

selecting and adding a first treatment into the existing rooting soil in the first improvement zone based upon the evaluation of the existing rooting, the treatment being selected from the group consisting of: organic matter, fertilizer, mycorrhizae fungi, a soil conditioner, and combinations thereof; and maintaining the treated existing rooting soil within the first improvement zone.

2. The method of claim 1 further comprising the steps of:

defining a critical root zone encompassing the first improvement zone;

defining a second improvement zone within said critical root zone;

loosening the existing rooting soil in one or more portions of the second improvement zone with an air excavator; and adding a second treatment into the existing rooting soil in the second improvement zone, the treatment being selected from the group consisting of: organic matter, fertilizer, mycorrhizae fungi, a soil conditioner, and combinations thereof.

3. The method of claim 1 further comprising the step of irrigating the first improvement zone prior to loosening the existing rooting soil in one or more portions of the first improvement zone.

4. The method of claim 1 wherein the step of loosening the existing rooting soil in the first improvement zone includes angling the air excavator at an angle of between 70° to 90° from ground level.

5. The method of claim 2 further comprising the step of irrigating the second improvement zone prior to loosening the existing rooting soil in one or more portions of the second improvement zone.

6. The method of claim 2 wherein the step of loosening the existing soil in said second improvement zone includes angling the air excavator at an angle of from about 70° to 90° from ground level.

7. The method of claim 2 wherein the step of excavating the second improvement zone includes loosening the existing soil to a depth of at least 6 to 8 inches below ground level.

8. A method of improving a condition of existing soil around a plant to facilitate growth of the plant comprising the steps of:

defining a first soil improvement zone that comprises a radius ($r_1$) from a center point of a trunk of the plant which is approximately 3–4 times the diameter of the trunk;

loosening and removing at least a portion of the existing soil in the first soil improvement zone with an air excavator, which releases compressed air at supersonic speeds, to a depth of up to 18 inches;

analyzing roots of the plant in the first soil improvement zone;

analyzing the existing soil condition in the first soil improvement zone;

applying a first treatment into the existing soil of the first soil improvement zone based upon the analysis of the roots and the existing soil in the first soil improvement zone, the treatment selected from the group consisting of: organic matter, fertilizer, mycorrhizae fungi, a soil conditioner, and combinations thereof.

9. The method according to claim 8 further comprising the steps of:

defining a second soil improvement zone that comprises a radius ($r^2$) from a center point of the trunk of the plant, the radius ($r_2$) being larger than the radius ($r_1$), the second soil improvement zone having an outer radius at least as large as a dripline of the plant;

loosening and removing at least a portion of the existing soil in the second soil improvement zone with an air excavator to a depth of up to 18 inches;

analyzing the existing soil condition in the second soil improvement zone;

applying a second treatment into the existing soil of the second soil improvement zone based upon the analysis of the soil in the second soil improvement zone, the treatment selected from the group consisting of: organic matter, fertilizer, mycorrhizae fungi, a soil conditioner, and combinations thereof.

\* \* \* \* \*